United States Patent [19]

Dougherty

[11] Patent Number: 4,648,159
[45] Date of Patent: Mar. 10, 1987

[54] FASTENER FOR A LACE OR ROPE OR THE LIKE

[76] Inventor: John F. Dougherty, 1104 E. "A" St., Yakima, Wash. 98902

[21] Appl. No.: 713,223

[22] Filed: Mar. 18, 1985

[51] Int. Cl.⁴ .......................... F16G 11/00; A43C 7/00
[52] U.S. Cl. .......................................... 24/117; 24/18; 24/140; 24/146; 24/156
[58] Field of Search ...................... 24/117 R, 140, 144, 24/145, 146, 148, 143 B, 18, 19, 336, 150 R, 150 P, 489

[56] References Cited

U.S. PATENT DOCUMENTS

| 73,358 | 1/1868 | McCeney | 24/18 |
| 254,343 | 2/1882 | Lequin | 24/117 R |
| 500,565 | 7/1893 | Dowse | 24/146 |
| 601,805 | 4/1898 | Cook | 24/140 |
| 621,734 | 3/1899 | Adamson | 24/148 |
| 695,012 | 3/1902 | Telfer | 24/144 |
| 730,031 | 6/1903 | Leopold | 24/117 R |
| 878,719 | 2/1908 | Gardyne | 24/143 B |
| 1,215,708 | 2/1917 | Rosenwasser | 24/146 |
| 1,247,479 | 11/1917 | Zepp | 24/18 |
| 1,460,207 | 6/1923 | Mitchell | 24/18 |
| 1,598,704 | 9/1926 | Bosse | 24/18 |
| 1,687,856 | 10/1928 | Wollaston | 24/18 |
| 1,730,462 | 10/1929 | Jaques | 24/117 R |
| 3,209,422 | 10/1965 | Dritz | 24/150 P |
| 3,221,384 | 12/1965 | Aufenacker | 24/146 |
| 3,231,076 | 1/1966 | Freiman | 24/336 |
| 3,418,733 | 12/1968 | Tyrrell, Sr. et al. | 24/117 R |
| 3,808,646 | 5/1974 | Brumlik | 24/150 R |
| 4,044,429 | 8/1977 | Wagner | 24/156 |
| 4,071,927 | 2/1978 | Bagnasco | 24/156 |
| 4,378,617 | 4/1983 | Burns | 24/336 |
| 4,489,466 | 12/1984 | Bakker | 24/489 |

FOREIGN PATENT DOCUMENTS

| 415379 | 9/1910 | France | 24/140 |
| 699316 | 2/1931 | France | 24/18 |
| 58406 | 3/1925 | Sweden | 24/117 R |
| 83611 | 12/1918 | Switzerland | 24/18 |
| 23712 | of 1910 | United Kingdom | 24/143 B |
| 1435 | of 1915 | United Kingdom | 24/117 R |

Primary Examiner—Victor N. Sakran
Attorney, Agent, or Firm—John E. Benoit

[57] ABSTRACT

A device for removably securing a line or the like, said device having a base with at least one fastener integral therewith. The fastener has at least one wall extending outwardly therefrom and is, effectively, flexibly secured to the base with the wall terminating in a lip. In one configuration, the base has a ridge opposite the lip with the ridge and lip being substantially adjacent each other and a spike or serrated member which is secured within the fastener and extends in the direction of the lip and the ridge so that a lace or the like may be forced past the lip and ridge and be impaled by the spike, thereby retaining the lace in a fixed position. In a modification of the present invention, one or more walls may extend from the base with each wall terminating in a lip in opposed positions. Thus, the lips of the wall form the opening instead of the lip and ridge of the wall and base. The various modifications of the device are multifunctional in application.

26 Claims, 35 Drawing Figures

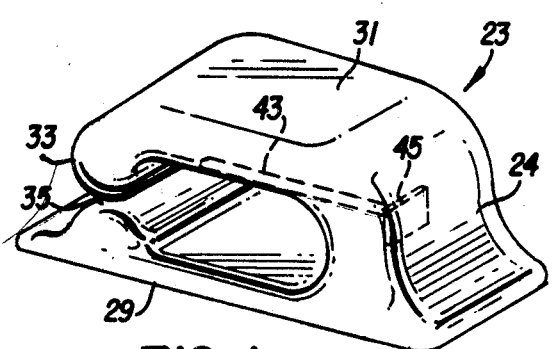
FIG. 1
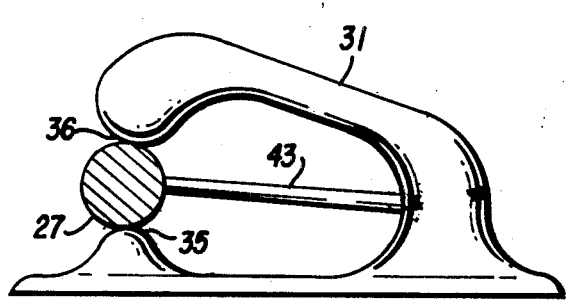
FIG. 2
FIG. 3
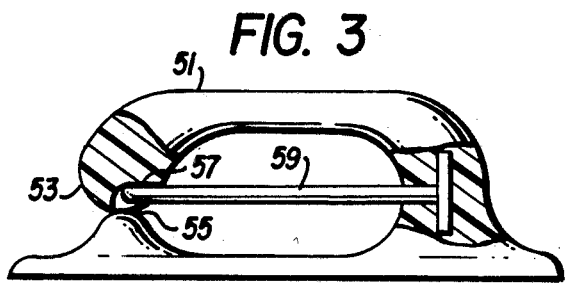
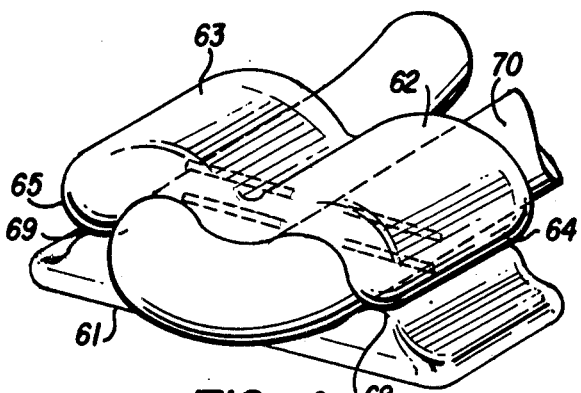
FIG. 4
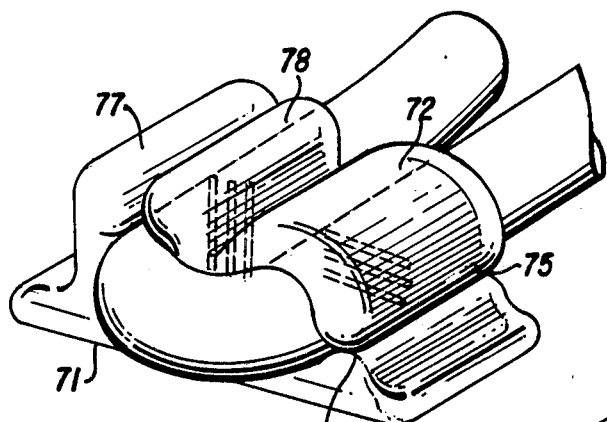
FIG. 5
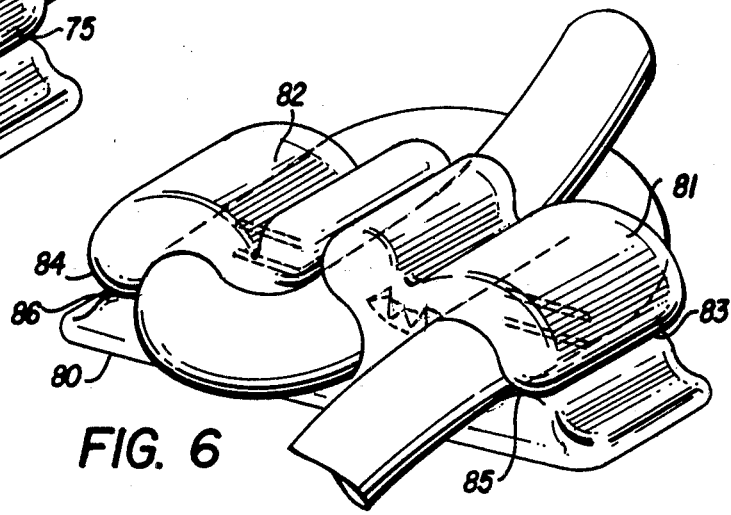
FIG. 6

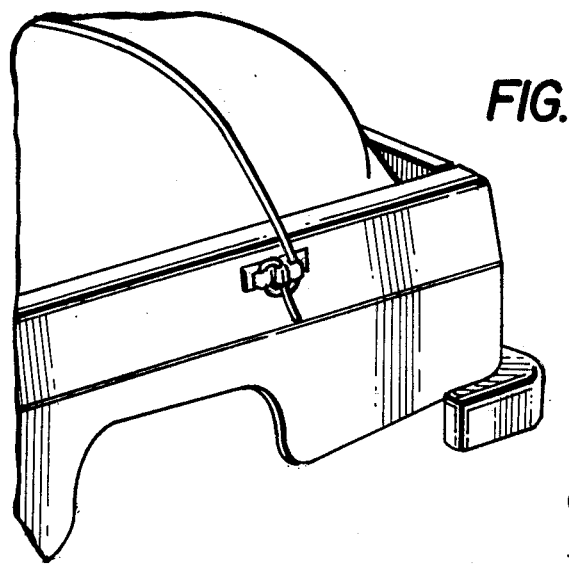
FIG. 7
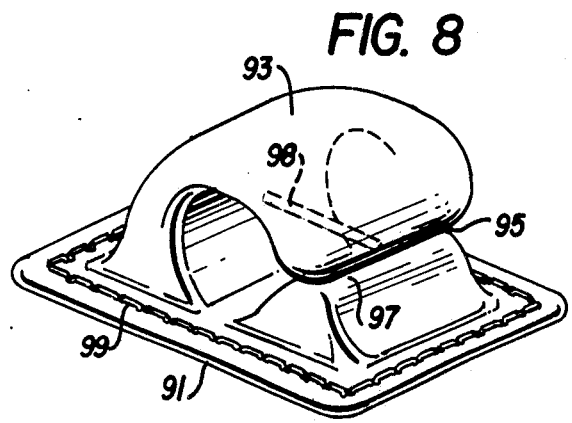
FIG. 8
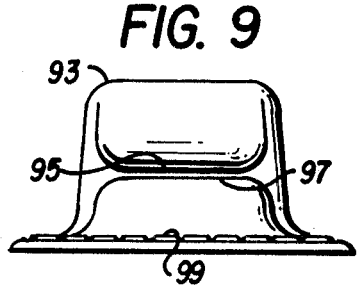
FIG. 9
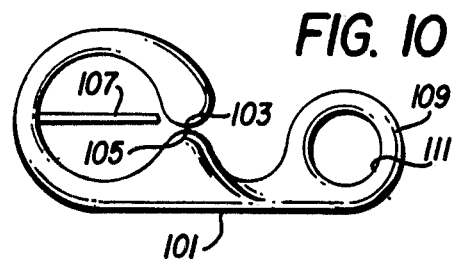
FIG. 10
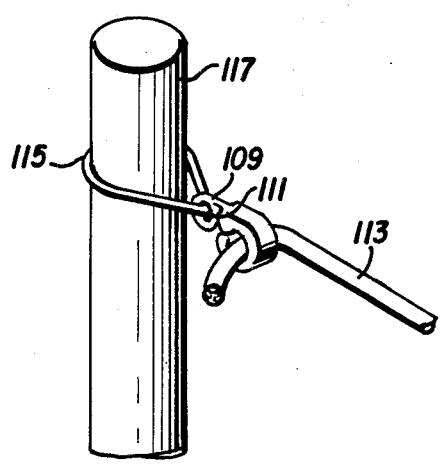
FIG. 11
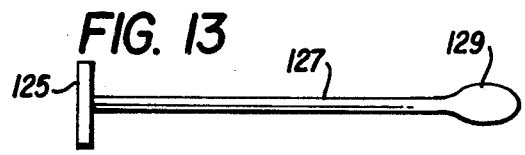
FIG. 12
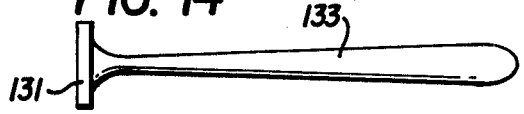
FIG. 13
FIG. 14
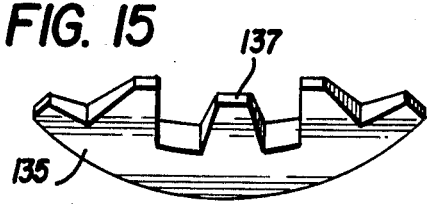
FIG. 15

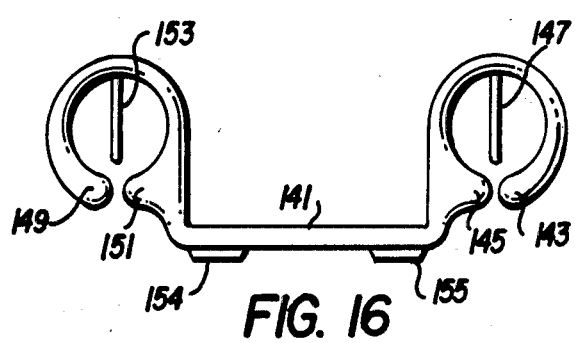
FIG. 16
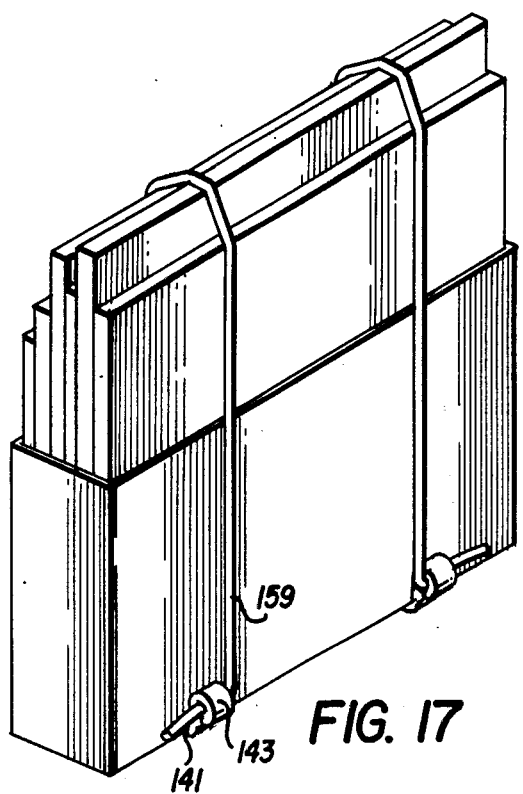
FIG. 17
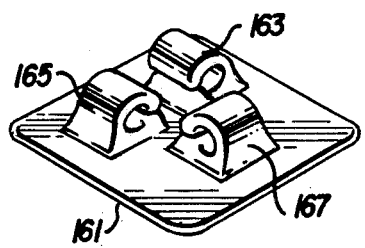
FIG. 18
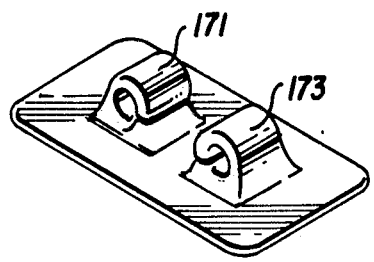
FIG. 20
FIG. 19
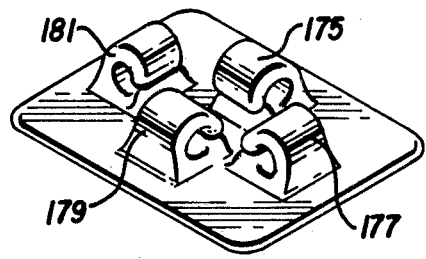
FIG. 21
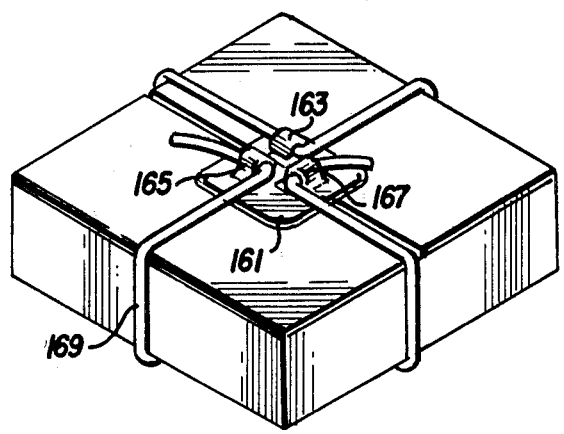

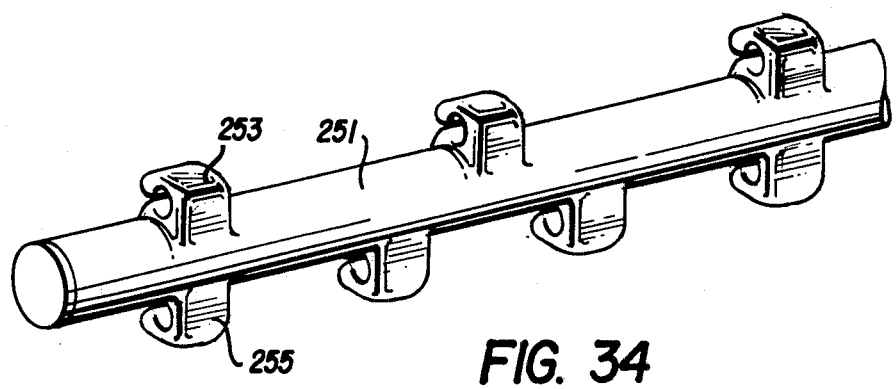
FIG. 34
FIG. 35
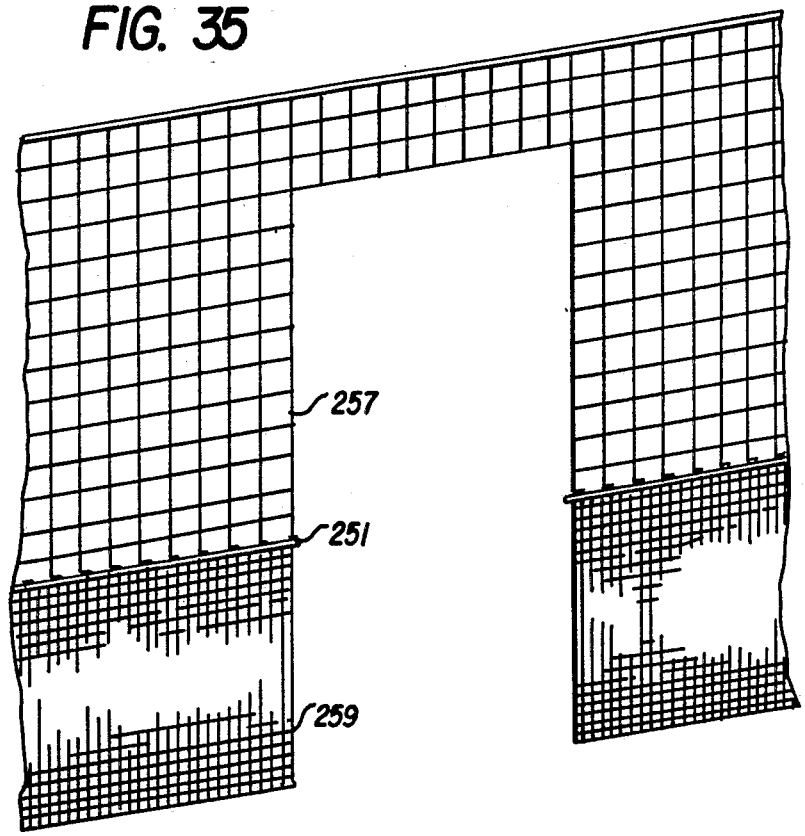

FASTENER FOR A LACE OR ROPE OR THE LIKE

This invention relates generally to fasteners and more specifically to fasteners which removably secure a lace or rope or the like in a position to prevent movement thereof.

Among the many fastening systems that are available at the present time, the primary fastener still remains the use of a line such as a string, twine, rope and the like. The following are illustrations of some of the uses of such a line for fastening systems which are applicable to the present invention.

1. The line may be linked to another line which is already secured in an established position.
2. The line may be linked to another line to form a longer line.
3. Any number of lines may be linked in a certain manner to form netting.
4. The line may be linked to itself so as to form an enclosure for holding articles together.
5. The line may be linked to itself so as to form an enclosure securing another enclosure such as a box or a package.
6. The line may be used in conjunction with lace hooks to fasten various objects such as shoes or boots.
7. The line may be used in conjunction with a deadman to secure a boat or in conjunction with a tie down to secure a load on a truck.

These and other functions commonly involve the tieing of knots which obviously requires a certain amount of time and, in some cases, requires particular learning skills. The system of the present invention offers advantages of simplification in that it eliminates the need to tie knots while accomplishing the same results in less time and without requiring any particular skill.

U.S. Pat. No. 254,343, issued Feb. 28, 1882 to Lequin and U.S. Pat. No. 730,031, issued June 3, 1903 to Leopold present an alternative to the above discussed methods of lacing. The Lequin patent proposes to use a non-flexible metal hook wherein a spike or the like is secured in the hook at its rear part and extends in a downwardly or outwardly fashion. This hook is used for securing the palm side of a glove. These spikes are designed so as to penetrate the lace and hold it in position.

The Leopold patent has much the same type of proposal wherein a non-flexible metal hook is used with some additional type of material secured therein so as to provide a reduced area at the outer ends thereof with a centrally embedded spike. This device is also intended to penetrate the lace and hold it in position.

Both of the above patents are cumbersome in that they present the problem of manufacture wherein each individual eyelet terminates in a grommet or the like and each grommet is placed within the edge of material on opposite sides of an opening. Since the hooks are metal, there is very little or no flexibility and the unlacing is inhibited due to the fact.

Applicant is unaware of any such proposed type of fastening devices used for any other purpose than that of lacing the boots or gloves as illustrated in the above discussed patents.

Accordingly, it is an object of this invention to provide a device for removably securing a lace or the like having a base with at least one fastener integral therewith.

A further object of the invention is to provide a fastener having a base with a wall flexibly secured thereto terminating in a lip and a spike embedded betwen the wall and the base and extending toward the lip.

A further object of this invention is to provide an integrally molded strip with a plurality of fasteners integral therewith, each of said fasteners having a wall flexibly interconnected to the base and a spike or the like embedded in the base and extending toward the opening created by the wall and the base.

These and other objects of the invention will become apparent from the following description when taken together with the drawings.

BRIEF DESCRIPTION OF THE DRAWINGS

FIG. 1 is a perspective view of a basic type of fastener of the present invention;

FIG. 2 is a side elevation view of the fastener of FIG. 1 showing a lace passing into position within the fastener;

FIG. 3 is a partial sectional view of a modified version of the fastener of the present invention;

FIG. 4 is a perspective view of a further modification of the fastener of the present invention;

FIG. 5 is a perspective view of another modification of the fastener of the present invention;

FIG. 6 is a perspective view of a further modification of the fastener of the present invention;

FIG. 7 is a perspective view of the fastener of FIG. 6 as used in a particular environment;

FIG. 8 is a perspective view of a fastener of the present invention together with a base which may be sewn;

FIG. 9 is a front view of a fastener of FIG. 8;

FIG. 10 is a side elevation view of a further modification of the present invention;

FIG. 11 is a perspective view illustrating one of the uses of the fastener of FIG. 10;

FIGS. 12, 13 and 14 illustrate various configurations of the retaining means within the fastener;

FIG. 15 is a side elevation view of a modified retaining means;

FIG. 16 is a side elevation view of a further modification of the fastener having two fastening devices extending from a base;

FIG. 17 is a perspective view illustrating one of the uses of the fastener of FIG. 16;

FIG. 18 is a perspective view of a further modification of the fastener having a base and three fasteners;

FIG. 19 is a perspective view illustrating one of the uses of the fastener of FIG. 18;

FIGS. 20 and 21 are perspective views of further modifications of the fastener of FIG. 18;

FIG. 34 is a perspective view of a further modification showing a rod having integral opposed fasteners; and FIG. 35 is a view illustrating the use of the rod of FIG. 34.

BRIEF DESCRIPTION OF THE INVENTION

Figure 22:
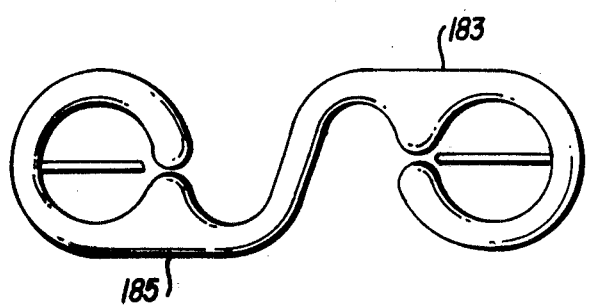
FIGS. 22 is a side elevation view of a further modification illustrating two fasteners integrally joined.

The present invention provides a device for removably securing a line or the like, said device having a base with at least one fastener integral therewith. The fastener has at least one wall extending outwardly therefrom and is, effectively, flexibly secured to the base with the wall terminating in a lip. In one configuration, the base has a ridge opposite the lip with the ridge and lip being substantially adjacent each other and a spike or serrated member which is secured within the fastener and extends in the direction of the lip and the ridge so that a lace or the like may be forced past the lip and ridge and be impaled by the spike, thereby retaining the lace in a fixed position. In a modification of the present invention, one or more walls may extend from the base with each wall terminating in a lip in opposed positions. Thus, the lips of the wall form the opening instead of the lip and ridge of the wall and base. The various modifications of the device are multifunctional in application.

DETAILED DESCRIPTION OF THE DRAWINGS

Turning now to the drawings, there is shown in FIG. 1 a perspective view of one of the embodiments of the fastener of the present invention. Base 29 has extending thereabove upper wall 31 with vertical wall 24 providing an interconnection therebetween. Since the entire fastener is integrally molded from a flexible plastic material with memory, wall 24 effectively attaches upper wall 31 flexibly to the base 29 so as to allow wall 31 to be moved in an upwardly and downwardly position. One such plastic is Delrin ® which is a Dupont product.

Wall 31 terminates in a downwardly extending lip 33 and base 29 has an upwardly extending ridge 35 opposite lip 33. The lip and ridge are prefereably of a dimension so as to be substantially adjacent each other thereby providing a closed area at the forward part of the fastener.

Spike 43, preferably of metal, is embedded at its base 45 within vertical wall 24. Spike 43 extends in a direction towards lip 33 and ridge 35. As can be seen from FIG. 2, wherein lace 27 is shown in a position passing between lip 33 and ridge 35, wall 31 is raised by the lace so as to allow the lace to pass between the lip and the ridge and be impaled by spike 43. After the lace is impaled on the spike, the memory of the plastic returns the lip and ridge to the position shown in FIG. 1. Removal of the lace reverses the sequence.

With this configuration, lace 27 can be quickly secured with the fastener. Further, it can be quickly removed from the fastener by merely lifting upwardly and outwardly thereby releasing the lace from the spike.

FIG. 3 is a partial cross-sectional view of a modification of the fastener of FIG. 2 wherein upper wall 51 terminates in lip 53 opposite ridge 55 as in FIG. 1. However, in this modification, a groove 57 is formed in the inner part of lip 53 and spike 59 extends outwardly so as to rest within groove 57. This provides a protective sheath for spike 59 since it is not exposed unless and until a lace is forced between lip 53 and ridge 55, raising lip 53 so as to allow the lace to be impaled on the spike. When the lace has entered the interior of the fastener, lip 53 will resume the position shown in FIG. 3, thus preventing any unwanted human contact with spike 59.

Turning now to FIG. 4, there is shown a further modification of the fastener of the present invention wherein base 61 incorporates two walls 62 and 63 extending in opposite directions, terminating in lips 64 and 65 with wall 61 having mating ridges 68 and 69. Additionally, there is shown the use of two spikes rather than one. When these spikes are used, they should be substantially parallel to each other and extend in the direction of the opening created by the lips of the ridge. This type of fastener may be used as as illustrated for securing the terminal end of rope 70.

FIG. 5 discloses a further modification of a fastener of the present invention wherein base 71 has one fastener including one wall extending in a manner parallel to the base and terminating in a lip 75, mating with ridge 76, and a further fastener having upstanding walls extending basically vertically from base 71 and terminating in mating lips 77 and 78. This type of fastener may be used for securing the end of a rope or the like as illustrated in FIG. 4.

FIG. 6 is yet a further modification of the fastener of the present invention wherein base 80 has two upper walls 81 and 82 terminating in lips 83 and 84 and mating with ridges 85 and 86 in much the same fashion as in FIG. 4. However, a double walled enclosure 82 extends upwardly between the two fasteners. This walled structure does not have any piecing means therein. However, it does include parallel ridges for retaining the end of the rope. These ridges are sufficient for holding the end of the rope since no substantial pressure is exerted at the point.

FIG. 7 illustrates one use of the fastener of FIG. 6 wherein it is secured to the side panels of a pickup truck by any well known means so that a load may be secured to the bed of the truck.

Turning now to FIG. 8, there is shown a further modification of the present invention wherein a base 91 includes integral upper wall 93 extending thereabove and terminating in lip 95 which mates with ridge 97 similar to that of FIG. 1. Again, spike 98 extends outwardly from the inner part of a fastener in the direction of the lip and ridge. As illustrated in this figure and in FIG. 9, lip 95 and ridge 97 may be substantially adjacent each other and, preferably, actually touch. This reduces the possiblity of the lip accidentally hooking any foreign object. This is permissible due to the flexibility and memory of the upper wall 93 and the intermediate vertical wall as discussed hereinabove. In the particular configuration of FIG. 8, the base is designed with a thin flange so as to permit it to be sewn on material by stitching 99 or, if so desired, the same broad bases provides an adequate area for attachment to an article using adhesives.

FIG. 10 shows a further modification of the fastener of the present invention wherein base 101 has an upper wall terminating in lip 103 mating with the ridge 105 on the base and spike 107 extending from the inner part of the fastener as discussed hereinabove. The opposite end of the base terminates in a flange 109 having a borehole 111 therethrough.

FIG. 11 illustrates one usage of the fastener of FIG. 10 wherein the flange 109 has a ring 115 passing therethrough so it may be pased over a post 117. In this manner, rope 113 may be passed between the lip and the ridge and impaled by the spikes so as to retain the end of the rope in the position as shown.

FIGS. 12 through 14 illustrate various preferred enlarged configurations of the spike or retaining means. FIG. 12 discloses a base 121 having a spike of substantially constant dimensions extending outwardly thereform. FIG. 13 shows a base 125 having a spike 127 extending outwardly therefrom with an enlarged end 129 which aids in retaining the lace or the like in place. FIG. 14 shows base 131 having a spike 113 extending outwardly therefrom with the geometrical configuration of the spike increasing in cross-sectional area as it approaches the outer end of the spike.

FIG. 15 shows a base 135 being serrated so as to have flattened teeth 137 extending therefrom so as to retain the lace within the fastener. A use for this type of gripping device has been illustrated in FIG. 6.

FIG. 16 shows a further modification of the present invention wherein a base 141 has an upstanding fastener extending from both ends. The fasteners terminate in lip 143 and 149 which mate with ridges 145 and 151 on the vertical part of the base. Additionally, each fastener has spikes 147 and 153 contained therein. The base may also have integral legs 154 and 155.

FIG. 17 shows one use of the fastener 118 wherein a box having varoous items contained therein uses ropes 159 to maintain the items in the box. Since the fasteners are connected by base 141, made of flexible plastic, the device may be used for boxes having widths up to the dimension of the distance between the two fasteners.

FIG. 18 discloses a further modification of the present invention wherein a base 161 includes three fasteners extending upwardly therefrom with two of the fasteners 163 and 165 being in opposing configuration and the third fastener 167 facing those two fasteners but being removed by 90°.

FIG. 19 discloses how such a device may be used for securing a package by placing the base on one of the faces of the package and securing the line as disclosed. The base may have some adhesive to hole it in place on the box while the rope is being secured.

FIG. 20 discloses a modification of FIG. 18 where two fasteners 171 and 173 extend from the base in opposed fashion.

FIG. 21 discloses a further modification of the fastener of FIG. 18 wherein four fasteners are used all facing each other and spaced about the base at approximately 90° intervals. Either FIGS. 20 or 21 could be used in a manner similar to that illustrated in FIG. 19 as well as for other purposes.

FIG. 22 discloses a further modification of the present invention wherein two fasteners have an integral base including sections 183 and 185 with the fasteners facing in opposite directions. Each of the fasteners has a spike extending from the inner part as described hereinabove.

Figure 23:
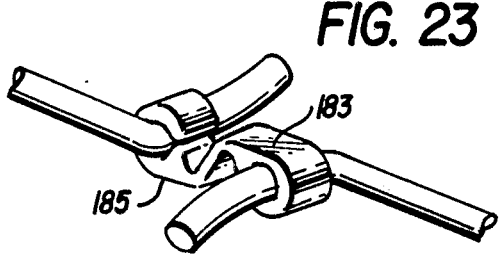
FIG. 23 is a perspective view illustrating one of the uses of the fastener of FIG. 22.

FIG. 23 illustrates one usage of the fastener of FIG. 22 wherein, as can be seen, the fastener provides for the securing of the ends of two different ropes or the ends of a single rope.

Figure 24:
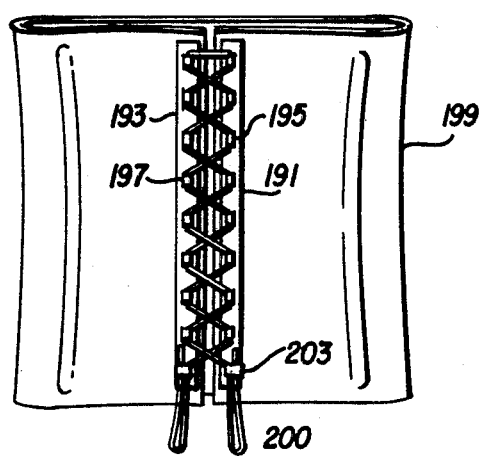
FIG. 24 is a perspective view of the use of a strip including a plurality of fasteners as used with a garment.

FIG. 24 illustrates a further usage of the fastener of the present invention wherein two strips 191 and 193, having a plurality of fasteners 195 and 197 are secured to the edges of wearing apparel for interconnection by a lace. Such a garment may be a back brace 199 which may be secured with varying tension levels according to individual need by the lacing method using lace 200. Fastener 203, of the type discussed relative to FIG. 25 may be used to secure the ends of lace 200.

Figure 25:
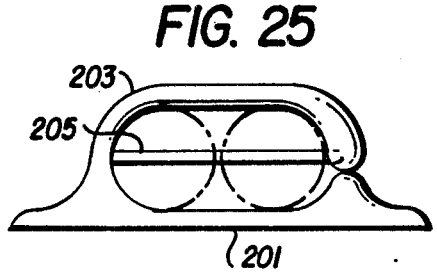
FIG. 25 is a side elevation view of a further modification illustrating an enlarged fastener which accepts two laces.

FIG. 25 illustrates a further modification of the present invention wherein base 201 has a lengthened upper wall 203 extending thereform with a lengthened spike 205 so as to accommodate a double lace with the spike penetrating both laces as previously indicated, one example of the use of this fastener is shown in FIG. 24.

Figure 26:
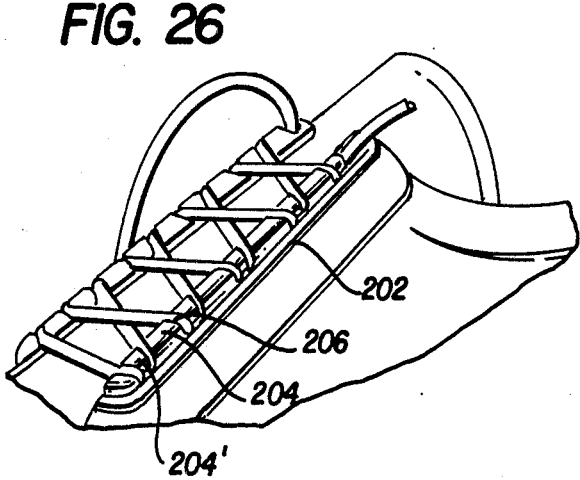
FIG. 26 is a perspective view of a further modification of the fastener.

FIG. 26 illustrates a further embodiment of the present invention which may be used with a shoe. A substantially smooth elongated base 202 having a substantially smooth profile includes angular channels 206 extending through the upper wall so as to provide a plurality of upper walls 204 and 204' similar to those discussed hereinabove. Walls 204' form fasteners which include lace penetrating means (not shown) so that the shoe may be laced as illustrated. These fasteners are flexible so that the shoe may be easily laced and unlaced.

Figure 27:
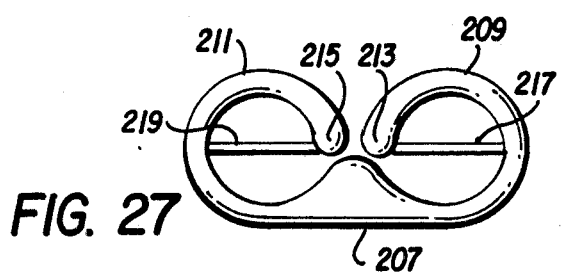
FIG. 27 is a side elevation view of a further modification of the fastener of the present invention showing opposed fasteners extending from a base.
Figure 28:
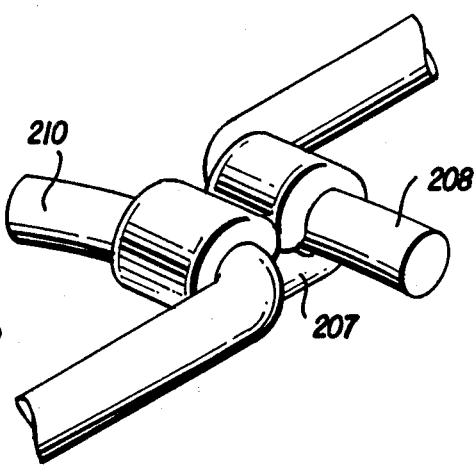
FIG. 28 is a perspective view illustrating the use of the fastener of FIG. 27.

FIG. 27 discloses a further modification of a fastener of the present invention wherein base 207, two upper walls 209 and 211 extending thereabove terminating in lips 213 and 215 which are in opposing configuration. Both lips extending above the associated ridge on the base with each having associated spikes 217 and 219. As shown in FIG. 28, this type of fastener may also be used to connect the ends of two separate lines 208 and 210, or the ends of the same line.

Figure 29:
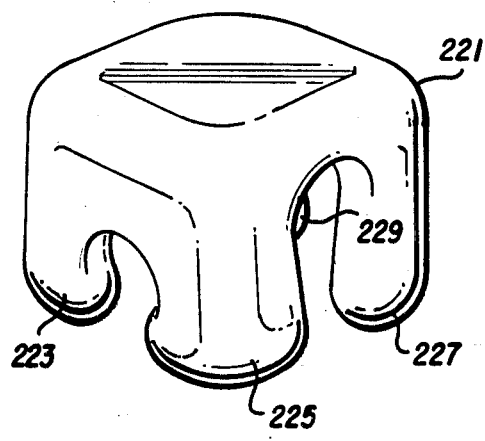
FIG. 29 is a perspective view of a further modification of the fastener of the present invention.
Figure 30:
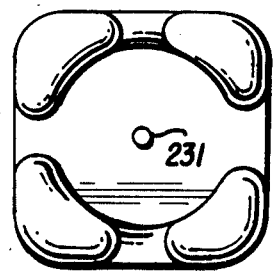
FIG. 30 is a bottom view of the fastener of FIG. 29.
Figure 31:
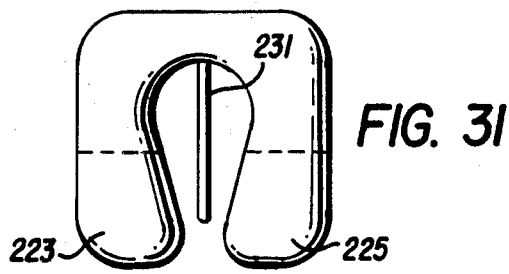
FIG. 31 is a side view of the fastener of FIG. 29.

FIGS. 29, 30 and 31 illustrate a further modification of the present invention. FIG. 29 is a perspective view, FIG. 30 is a bottom view and FIG. 31 is a side view of the fastener. The fastener has a base 221 from which four walls extend outwardly therefrom and terminate in lips 223, 225, 227 and 229. Spike 231 extends centrally outwardly in a direction between the lips.

Figure 32:
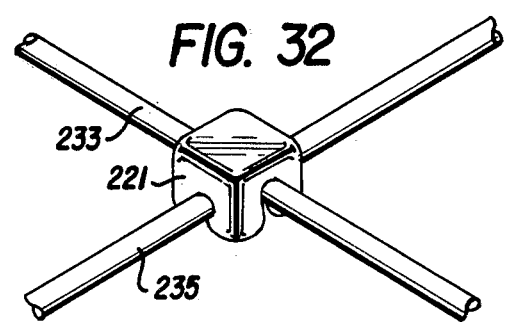
FIG. 32 is a perspective view illustrating one use of the fastener of FIG. 29.

FIG. 32 shows one use for the type of fastener shown in FIG. 29 wherein the spike is of sufficient length so that two lines may be secured therein at substantially right angles.

Figure 33:
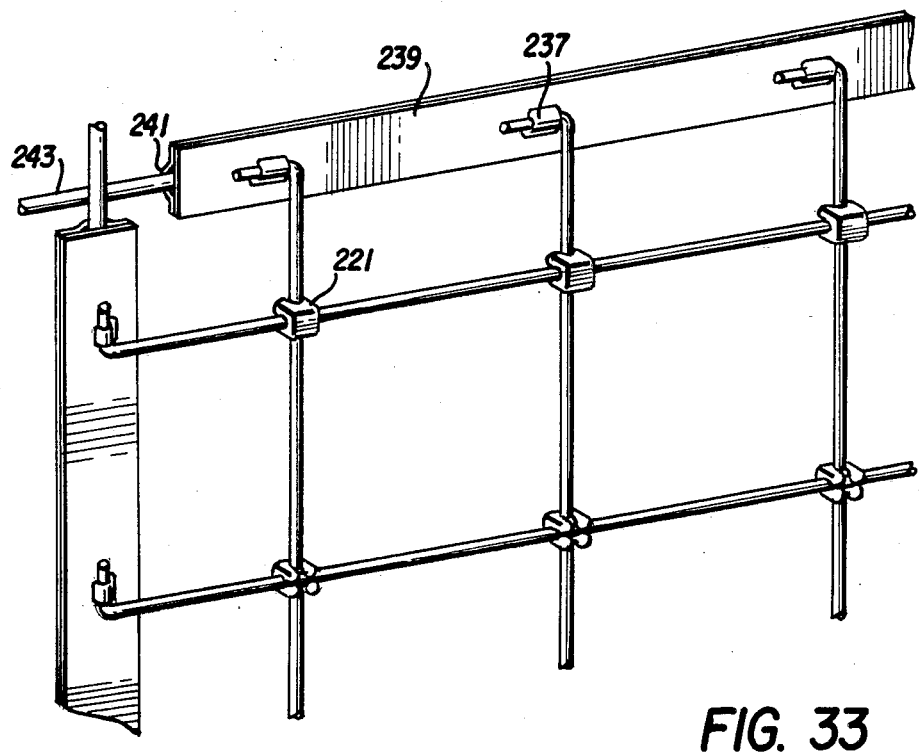
FIG. 33 is a perspective view further illustrating the use of the fasteners of FIG. 29 and FIG. 32 so as to form a netting.

FIG. 33 discloses how the fastener of FIG. 29 may be used. In this configuration, fasteners 237 are integrally formed with strip 239. Strip 239 is secured at its edges to backing member 241 so as to leave an area through which line 243 may be passed. As can be seen, by using separate lines in a 90° fashion, a netting of any size, shape or configuration may be formed.

FIG. 34 discloses a further modification of the fastener of the present invention which may be used with the fastener as illustrated in FIG. 33, particularly for decorative purposes. Rod 251 includes integrally formed fasteners 253 and 255 on opposite sides thereof. As shown, more fasteners 255 are provided per linear foot than fasteners 253. It should be noted that the number and spatial relationship of the fasteners may be used in accordance with any preselected pattern. Additionally, the rod could be curved if desired.

Use of the rod fastener of FIG. 34 is illustrated in FIG. 35. Rod 251 is shown as hanging from a mesh, as disclosed in FIG. 33, of a particular size using fasteners 253. Because of the increased number of fasteners 255, a smaller mesh 259 may be hung below the rod. This provides a decorative means as well as a means for privacy at lower levels.

The following advantages are now apparent from the above description and drawings.

The function of linking one line into the position established by another fastener is illustrated in FIG. 11 where the opening 111 secures the fastener to the established link. Another line 113 can swiftly be attached and detached at the other end of the fastener. Such fastener could be used in a gymnasium situation where successive groups of players bring their own nets attaching and detaching them to the established fasteners in turn.

The function of linking line to line as illustrated in Fig. 23, could be used if, for example, a common clothes line were cut or broken in its mid section. Ordinarily, it would be necessary to untie theline at either end to free enough line to allow the tying of a knot reuniting the broken halves. If there were no line to spare, it would be necessary to replace the entire line. However, through the use of the fastener of FIG. 23, the line could be repaired without untying or tying anything and the exact tension desired reestablished in seconds, a fraction of the time by any other solution and without the expense of a new line.

The fastener, as disclosed in FIGS. 29-33 secures, at the point of intersection, two lines crossing on a common plane at an angle of 90 degrees. This fastener allows the easy formation of a net of any size and uniquely, of any shape, (not merely squares and rectangles). It eliminates any need for weaving lines together or for tying knots at intersections.

Further, in conjunction with the rod fasteners of FIG. 34, multi-mesh nets may be formed as illustrated in FIG. 35. Nets used today, such as fishing nets, form part of the interior decoration of many restaurants, stores and private homes. Employing the system of the present invention this decorative technique can be greatly expanded. For example, multi-mesh nets could be used as booth dividers in restaurants; a tight mesh at head level, a looser mesh rising toward the ceiling. Again, a net could easily be made to provide a room dividing "wall" with arched doorway or the like. Such a net could be employed as a trellis for climbing plants with heavy meshes where heavier foilage is desired. Such techniques offer designers and decorators unlimited versatility. Further, such structures would be very low in material cost, be easily assembled on site or elsewhere and require no special skill or tools. The system allows an even quicker, simpler disassembly with no loss of material.

The fastener of FIG. 16 may be used with a single line to form an enclosure for holding articles together. FIG. 17 illustrates two such fasteners in use.

The three configurations of the fastener disclosed in FIGS. 18, 20 and 21 may be used with a line to secure a container or the like. FIG. 19 illustrates a box or package thus secured. The method most commonly used today to secure a box with a line ideally requires three hands, the third hand to prevent movement of the line and loss of tension while the other two hands knot the line. Through the use of such fasteners as illustrated, especially if they were provided with "stick-on" bottoms, a line could secure a box quickly, easily and with only one hand.

The most commonly used system for fastening footware comprises laces and eyelets, but this system has some well known drawbacks. For example, a considerable amount of time is generally required for the lacing and unlacing process. After lacing, more time is often required to tighten the different levels to achieve a desirable tension and, finally, knotting is necessary to maintain such tension insofar as possible. In untying, the knot must be undone so that the tension is released enough to allow the withdrawal of the foot. This usually requires that the lace be completely taken out of the upper levels of eyelets. Even more time is required when the lace must be completely removed for washing or to allow the cleaning and polishing of the footware. When lace ends are frayed, the lacing process becomes almost impossible. Further, although it might be possible to establish a comfortable tension at every lacing level during the lacing process, it cannot be maintained during use since the lace moves between eyelets in response to pressure from the foot or leg. This very common problem leads countless boot and shoe users to leave the upper levels of lacing eyelets unused, thus losing the intended support in that area. Countless others suffer varying degrees of pain and discomfort in order to obtain the full support of their footware. Still others, despairing of finding the style of footware they want with the comfort they require, restrict their activities or press unsuitable footware into unintended uses, like wearing western boots for climbing hills.

A less commonly used alternative lacing system makes use of metal hooks. This system allows quick and easy installation and removal of a lace but it has serious drawbacks. Because the hooks protrude well above the surface of the footware and because they are made of hard metal formed like a hook open on three sides, they are a constant hazard to snare any foreign object such as a pant leg, table cloth or another lace, hence they can cause tearing and tripping. Additionally, if brought into contact with furniture or painted surfaces, they can cause pitting or scratching. Further, if any force is brought against the lacing area of such footware, the protruding hard metal hooks will intercept it and transfer it directly to the foot or leg with consequent pain and possible injury. Attempting to minimize this hazard adds bulk, weight and cost to footware. Todays lace hooks are manufactured singly, one at a time and must be handled, positioned and attached one at a time; such labor-intensive work necessarily adds notably to cost. Further, protruding, angular metal hooks cannot be blended stylistically with a smooth leather finish. As with the eyelet system, systems using lace hooks as manufactured today, offer no tension control of the lace since it moves between hooks in response to pressure from foot or let rather than in response to the requirements of comfort.

The system as illustrated in FIG. 26 elminates every single problem encountered in the lacing systems discussed above. Swift and easy lacing is simultaneous with establishing the desired tension at each lacing level. Once set, the tension cannot alter, so that maximum comfort is achieved and maintained until the footware is removed. Unlacing inswift and easy. Since the lace need not pass through narrow eyelets, frayed lace ends are of no connsequence. Force brought against the lacing area is now even less dangerous than with the eyelet system since the broad based flexible lacing strips as shown will absorb and distribute it. These strips may be strong and lightweight, which are easily and inexpensively produced with automatic equipment. Further, the streamlined design, low profile and closed mouths of the fasteners present no hazard to extraneous objects. Finally, being plastic, the lacing strips of FIG. 26 can be produced with any color and finish, thus lending themselves to easy stylistic blending with any footware. Also the fasteners could include a soft plastic layer on the outer surface thereof if a more gentle surface is needed or required.

Referring to FIGS. 4, 5 and 6, the precise combination of fasteners to be chosen depends, of course, on the particular purpose to be served and the composition of the rope being used. Ordinarily, when mooring a boat or stabilizing a load on a small truck, ropes are fixed to some type of cleat by the tying of knots. Care and skill are required lest a poorly knotted rope release and a valuable boat or load be lost. A knot improperly tied might also be very difficult to untie, leading to frustration and lost time.

The fasteners of FIGS. 4, 5 and 6 allow the almost instantaneous secure attachment of a rope with the simultaneous establishment of any desired tension. Referring to FIG. 7, the rope need simply be drawn to the desired tension alongside the mouth of either the fastener on the right or left, then, while maintaining that tension the rope is moved sideways through the mouth of the fastener and into its body where it is impaled on the spikes. The hands now no longer need to grip the rope with any particular force, but can, in an easy manner, rotate the free portion of the rope and attached it to the opposite fastener without leaving any slack. The rope is now doubly secured and the loose end can be looped in any fashion then fixed in the central retainer, thus presenting a neat, finished appearance. Of course, any later tightening that might become necessary can be accomplished with equal ease. Removal of the rope requires the simple reversal of the procedure.

As will now be obvious, the present invention provides a fastening device for various uses relating to lacing and securing of lines and ropes. It is to be understood that the above description and drawings are illustrative only and that modifications could be made in any of the fasteners described without departing from the scope of the invention which is to be limited only by the following claims.

I claim:

1. A device for removably securing a lace or the like molded from a flexible plastic material with memory comprising
   a substantially flat base;
   a plurality of fasteners integral with and extending above said base, each of said fasteners comprising;
   an upper wall;
   means integral with said wall and said base for flexibly interconnecting said wall to said base;
   a lip at the terminal end of said upper wall extending toward said base;
   a ridge extending integrally from said substantially flat base opposite said lip; and
   at least one lace penetrating means secured within said means integral with said wall and extending toward said lip.

2. The device of claim 1 wherein said lace penetrating means comprises a spike.

3. The device of claim 1 wherein said lace penetrating means comprises a plurality of spikes.

4. The device of claim 1 further comprising
   a slot in the inner wall of said lip and wherein said penetrating means is of a length such that the end thereof mates with the slot.

5. The device of claim 1 wherein said lip and said ridge are in contact.

6. The device of claim 1 wherein a preselected number of said fasteners include a lace retaining means in place of said lace penetrating means.

7. The device of claim 1 wherein each of said fasteners comprises a plurality of lace penetrating means secured within said means integral with said wall.

8. The device of claim 1 comprising two adjacent fasteners secured to said base extending in substantially opposite directions.

9. The device of claim 1 further comprising a flange integral with said base and extending about the periphery thereof.

10. The device of claim 1 further comprising
    an integral flange extending beyond said ridge; and
    a borehole in said flange.

11. The device of claim 1 wherein said lace penetrating means comprises
    a spike having a substantially uniform cross-sectional area between the base and tip thereof.

12. The device of claim 1 wherein said lace penetrating means comprising
    a spike having an increased cross-sectional area at the tip thereof.

13. The device of claim 1 wherein said lace penetrating means comprises
    a spike having a gradually increasing cross-sectional area between the base the tip thereof.

14. The device of claim 1 wherein said base is U-shaped with a fastener extending outwardly from the legs of said U-shape.

15. The device of claim 1 further comprising
    a third fastener integral with said base spaced from and facing said first and said second fastener.

16. The device of claim 15 further comprising
    a fourth fastener integral with said base spaced from and facing said first and said second fasteners opposite to said third fastener.

17. The device of claim 1 wherein said base comprises an elongated strip;
    said plurality of said fasteners extending above said strip with said lips facing outwardly from said strip.

18. The device of claim 1 wherein said upper wall is elongated so as to increase the base area covered thereby.

19. The device of claim 1 wherein said base comprises said rod;
    a plurality of fasteners being integral with and spaced along the length and about the circumference of said rod;
    said fasteners being spaced so as to provide a preselected spatial and numerical relationship.

20. The device of claim 1 wherein said device comprises
    an elongated base having a substantially smooth profile;
    angular channels extending through said upper wall so as to provide a plurality of upper walls; and
    lace penetrating means associated with at least alternate walls.

21. The device of claim 1 wherein said plurality of fasteners comprises first, second, third and fourth walls extending upwardly from said base and terminating in lips, said walls being substantially circumferentially equally spaced from each other with said lips facing inward.

22. A device for removably securing a lace or the like molded from a flexible plastic material with memory comprising
a substantially flat base;
at least one fastener integral with and extending outwardly from said base, said fastener comprising;
an upper wall;
means integral with said wall and said base for flexibly interconnecting said wall to said base;
a lip at the terminal end of said upper wall extending toward said base;
a ridge extending integrally from said substantially flat base opposite said lip;
at least one lace penetrating means secured within said means integral with said wall and extending toward said lip;
a second fastener having parallel walls extending upwardly from said fastener with each wall terminating in lips adjacent each other; and
at least one lace penetrating means in said second fastener.

23. A device for removably securing a lace or the like molded from a flexible plastic material with memory comprising
a substantially flat base;
at least one fastener integral with and extending outwardly from said base, said fastener comprising;
an upper wall;
means integral with said wall and said base for flexibly interconnecting said wall to said base;
a lip at the terminal end of said upper wall extending toward said base;
a ridge extending integrally from said substantially flat base opposite said lip;
at least one lace penetrating means secured within said means integral with said wall and extending toward said lip;
a second fastener facing in the opposite direction from said one fastener;
lace penetrating means in said second fastener;
a third fastener between said one fastener and said second fastener said third fastener comprising parallel walls extending upwardly from said fastener with each wall terminating in a lip adjacent each other; and
lace retaining means secured within said third fastener.

24. The device of claim 23 wherein said lace retaining means comprises
a serrated elongated base having flattened teeth.

25. A device for removably securing a lace or the like molded from a flexible plastic material with memory comprising
a substantially flat base;
a first fastener integral with and extending outwardly from the legs of said base;
a second fastener integral with said base, said second fastener facing said first fastener, each of said fasteners comprising
an upper wall;
means integral with said wall and said base for flexibly interconnecting said wall to said base;
a lip at the terminal end of said upper wall extending toward said base;
a ridge extending integrally from said substantially flat base opposite said lip; and
at least one lace penetrating means secured within said means integral with said wall and extending toward said lip.

26. A device for removably securing a lace or the like molded from a flexible plastic material with memory comprising
a substantially flat base;
a first fastener integral with and extending outwardly from the legs of said base, said fastener comprising;
an upper wall;
means integral with said wall and said base for flexibly interconnecting said wall to said base;
a lip at the terminal end of said upper wall extending toward said base;
a ridge extending integrally from said substantially flat base opposite said lip;
at least one lace penetrating means secured within said means integral with said wall and extending toward said lip;
a second fastener substantially identical to said first fastener; and
a spike having a gradually increasing cross-sectional area between the base and the tip thereof.

* * * * *